US009313165B2

(12) United States Patent
Bastide et al.

(10) Patent No.: US 9,313,165 B2
(45) Date of Patent: *Apr. 12, 2016

(54) PROVIDING CONTEXTUAL RELEVANCE OF AN UNPOSTED MESSAGE TO AN ACTIVITY STREAM AFTER A PERIOD OF TIME ELAPSES (71) Applicant: International Business Machines Corporation, Armonk, NY (US)

(72) Inventors: Paul R. Bastide, Boxford, MA (US); Matthew E. Broomhall, Goffstown, NH (US); Fang Lu, Billerica, MA (US); Weisong Wang, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/554,244

(22) Filed: Nov. 26, 2014

(65) Prior Publication Data
US 2015/0222587 A1 Aug. 6, 2015

Related U.S. Application Data (63) Continuation of application No. 14/173,508, filed on Feb. 5, 2014.

(51) Int. Cl.
G06F 15/16 (2006.01)
H04L 12/58 (2006.01)

(52) U.S. Cl.
CPC ...................... *H04L 51/32* (2013.01)

(58) Field of Classification Search
USPC .......... 709/204, 206, 200, 223, 231; 707/728, 707/749
See application file for complete search history.

(56) References Cited

U.S. PATENT DOCUMENTS 6,125,399 A * 9/2000 Hamilton ................ H04L 29/06 370/392
8,239,397 B2 8/2012 Stefik et al.
(Continued)

FOREIGN PATENT DOCUMENTS

WO 2012058408 A2 5/2012

OTHER PUBLICATIONS

Disclosed Anonymously, "Method and System for Modifying Microblog/Status Updates Based on Social Network Relationships," IPCOM000213898D, Jan. 4, 2012, pp. 1-2.
(Continued)

Primary Examiner — El Hadji Sall
(74) Attorney, Agent, or Firm — Robert A. Voigt, Jr.; Winstead, P.C.

(57) ABSTRACT

A method, system and computer program product for providing contextual relevance of an unposted message to an activity stream after a period of time elapses. A comparison is made between the current state of the activity stream at a second point in time with respect to the state of the activity stream at a first point in time, which includes an unposted message. The relevance of the unposted message with respect to a current topic of interest in the activity stream at the second point in time is quantified. If the contextual relevance of the unposted message with respect to the current topic of interest in the activity stream at the second point in time is less than a threshold, then the user is presented with an indication of the contextual relevance of the unposted message to the activity stream.

7 Claims, 4 Drawing Sheets (56) References Cited

U.S. PATENT DOCUMENTS

| | | |
|---|---|---|
| 8,326,880 B2 | 12/2012 | Carson, Jr. et al. |
| 8,903,909 B1 * | 12/2014 | Marra .................... G06F 15/16 709/200 |
| 2010/0070485 A1 | 3/2010 | Parsons et al. |
| 2012/0042020 A1 * | 2/2012 | Kolari ................. G06Q 10/107 709/206 |
| 2012/0203831 A1 * | 8/2012 | Schoen ................. G06Q 10/10 709/204 |
| 2012/0296919 A1 | 11/2012 | Sinha et al. |
| 2013/0044959 A1 * | 2/2013 | Mitchell ................ G06Q 50/01 382/217 |
| 2013/0073989 A1 | 3/2013 | Harris et al. |
| 2013/0227596 A1 * | 8/2013 | Pettis ................. H04N 21/2353 725/13 |

OTHER PUBLICATIONS

Office Action for U.S. Appl. No. 14/173,508 dated Oct. 8, 2015, pp. 1-11.

* cited by examiner

PROVIDING CONTEXTUAL RELEVANCE OF AN UNPOSTED MESSAGE TO AN ACTIVITY STREAM AFTER A PERIOD OF TIME ELAPSES

TECHNICAL FIELD

The present invention relates generally to social network services, and more particularly to providing contextual relevance of an unposted message to an activity stream after a period of time elapses.

BACKGROUND

A social network service is an online service, platform or site that focuses on building and reflecting social networks or social relations among people who, for example, share interests, activities, backgrounds or real-life connections. A social network service essentially consists of a representation of each user (often a profile), his/her social links, and a variety of additional services. Most social network services are web based and provide means for users to interact over the Internet, such as by e-mail and instant messaging. Social networking sites allow users to share ideas, pictures, posts, activities, events, and interests with people in their network.

Social networking sites (e.g., Facebook®) present to a particular user the messages posted by users in a social networking feed often referred to as an "activity stream" (e.g., Facebook's® news feed). These messages or "posts" can include text (e.g., comments, sub-comments and replies), audio, video images, etc.

The posting of a message to the activity stream may not be immediate. For example, a user may take some time in crafting a message to be posted to the activity stream, such as re-reading the drafted post for spelling/grammatical errors. The user may also be interrupted while crafting the message, such as by a telephone call. Prior to the user posting the message, the focus of the activity stream may change thereby negating the relevance of the unposted message. For example, the focus of an activity stream may change to a different topic of interest after a period of time elapses in response to new users posting messages to the activity stream. If the user is not aware of the change in the focus of the activity stream, the user may post a message that is irrelevant to the current topic of interest in the activity stream thereby causing confusion among users participating in the activity stream.

Unfortunately, there is not currently a means for providing the user an indication of the contextual relevance of the unposted message to the activity stream after a period of time elapses.

BRIEF SUMMARY

In one embodiment of the present invention, a method for providing contextual relevance of an unposted message to an activity stream after a period of time elapses comprises saving a state of the activity stream at a first point in time which includes a message created by a user that has not yet been posted. The method further comprises comparing a state of the activity stream at a second point in time with respect to the state of the activity stream at the first point in time in response to a threshold amount of time elapsing since saving the state of the activity stream at the first point in time, where the second point of time occurs after the threshold period of time has elapsed since the first point in time. Additionally, the method comprises identifying, by a processor, a current topic of interest and one or more users contributing to posts pertaining to the current topic of interest in the activity stream at the second point in time. In addition, the method comprises presenting to the user the current topic of interest and list of the one or more users contributing to posts pertaining to the current topic of interest in the activity stream at the second point in time in response to detecting a contextual relevance of the unposted message with respect to the current topic of interest being below a threshold.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for providing the contextual relevance of an unposted message to an activity stream after a period of time elapses. In one embodiment of the present invention, the current state of the activity stream at a first point in time, which includes a message created by a user that has not yet been posted ("unposted message"), is saved. The "state" of the activity stream, as used herein, refers to a snapshot of the context of the activity stream (including the posted and unposted messages of the activity stream) at that particular point in time. The current state of the activity stream at a second point in time (occurs after a threshold period of time has elapsed since the first point of time) is compared with respect to the current state of the activity stream at the first point in time if a threshold amount of time has elapsed since the current state of the activity stream at the first point in time was saved. After identifying the current topic of interest of the activity stream at the second point in time, the relevance of the unposted message with respect to the current topic of interest in the activity stream at the second point in time is quantified. If the contextual relevance of the unposted message with respect to the current topic of interest in the activity stream at the second point in time is less than a threshold, then the user is presented with the current topic of interest in the activity stream at the second point in time and/or a list of the users contributing to the posts pertaining to the current topic of interest at the second point in time (including the social network relationship between the user crafting the unposted message and the users contributing to the posts pertaining to the current topic of interest at the second point in time) and/or the quantification of the relevance of the unposted message with respect to the current topic of interest in the activity stream at the second point in time in a summary pane. In this manner, the user is provided with an indication of the contextual relevance of the unposted message to the activity stream after a period of time elapses thereby providing the user an opportunity to modify the unposted message to be more relevant when finally posted to the activity stream.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
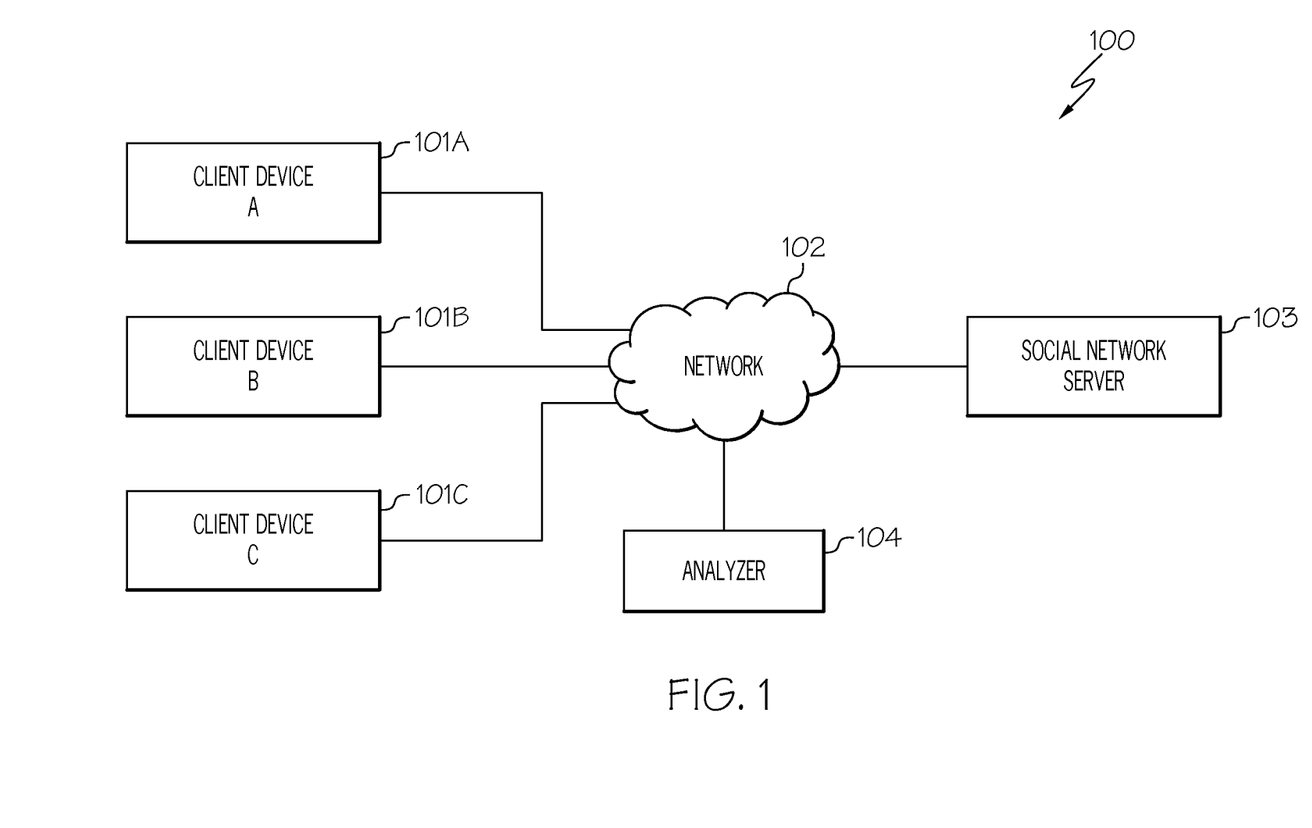
FIG. 1 illustrates a social network system configured in accordance with an embodiment of the present invention.

Referring now to the Figures in detail, FIG. 1 illustrates a social network system 100 configured in accordance with an embodiment of the present invention. Social network system 100 includes a community of users using client devices 101A-101C (identified as "Client Device A," "Client Device B," and "Client Device C," respectively, in FIG. 1) to be involved in social network system 100. Client devices 101A-101C may collectively or individually be referred to as client devices 101 or client device 101, respectively. Client device 101 may be a portable computing unit, a Personal Digital Assistant (PDA), a smartphone, a laptop computer, a mobile phone, a navigation device, a game console, a desktop computer system, a workstation, an Internet appliance and the like.

Client devices 101 may participate in a social network by communicating (by wire or wirelessly) over a network 102, which may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 further includes a social network server 103, which be a web server configured to offer a social networking and/or microblogging service, enabling users of client devices 101 to post messages (e.g., text-based messages) on social networks, including blogs, forums, communities, etc. "Messages," as used herein, include text-based messages that include any one or more of the following: text (e.g., comments, sub-comments and replies), audio, video images, etc. These messages may be posted in a social networking feed often referred to as an "activity stream" (e.g., Facebook's® news feed). Social network server 103 is connected to network 102 by wire or wirelessly. While FIG. 1 illustrates a single social network server 103, it is noted for clarity that multiple servers may be used to implement the social networking and/or microblogging service.

System 100 further includes an analyzer 104 connected to network 102 by wire or wirelessly. Analyzer 104 is configured to provide contextual relevance of an unposted message to an activity stream after a period of time elapses as discussed in further detail below. A description of the hardware configuration of analyzer 104 is provided below in connection with FIG. 2.

System 100 is not to be limited in scope to any one particular network architecture. System 100 may include any number of client devices 101, networks 102, social network servers 103 and analyzers 104. Furthermore, in one embodiment, analyzer 104 may be part of social network server 103. In another embodiment, analyzer 104 may be part of client device 101.

Figure 2:
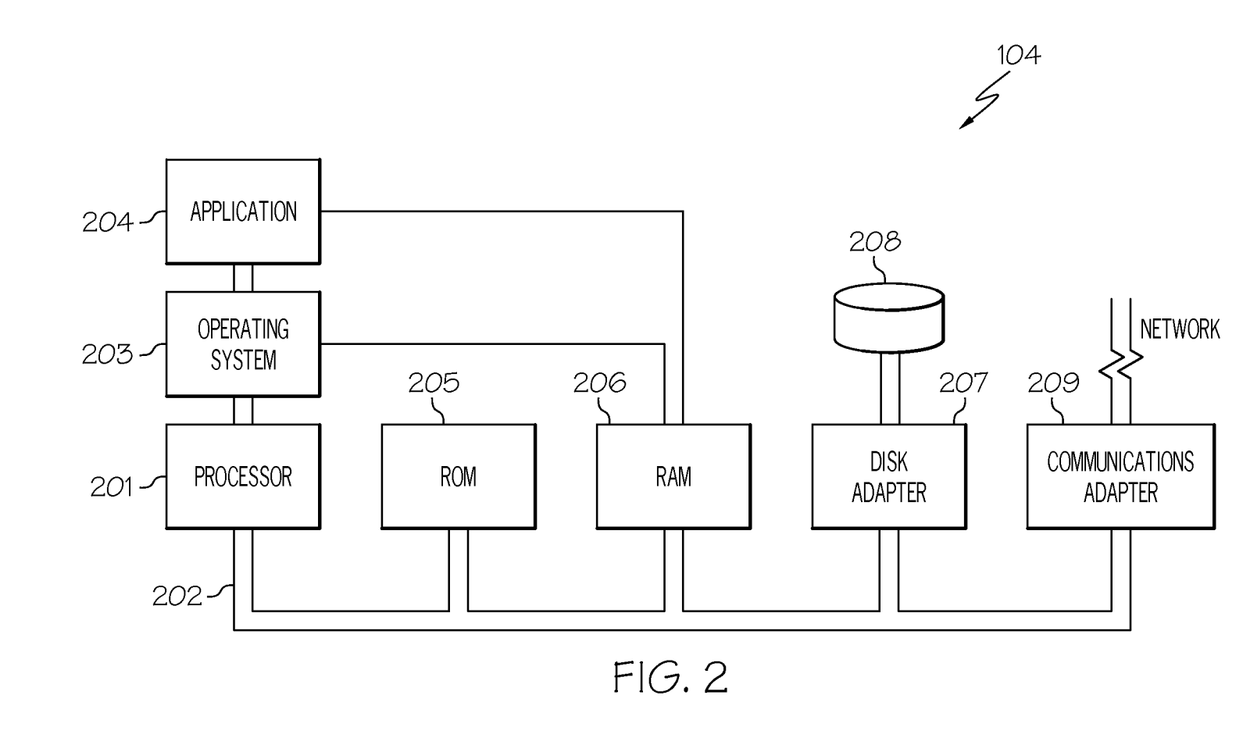
FIG. 2 illustrates a hardware configuration of the analyzer configured in accordance with an embodiment of the present invention.

Referring now to FIG. 2, FIG. 2 illustrates a hardware configuration of analyzer 104 (FIG. 1) which is representative of a hardware environment for practicing the present invention. Referring to FIG. 2, analyzer 104 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for providing contextual relevance of an unposted message to an activity stream after a period of time elapses as discussed further below in association with FIGS. 3-4.

Referring again to FIG. 2, read-only memory ("ROM") 205 is coupled to system bus 202 and includes a basic input/output system ("BIOS") that controls certain basic functions of analyzer 104. Random access memory ("RAM") 206 and disk adapter 207 are also coupled to system bus 202. It should be noted that software components including operating system 203 and application 204 may be loaded into RAM 206, which may be analyzer's 104 main memory for execution. Disk adapter 207 may be an integrated drive electronics ("IDE") adapter that communicates with a disk unit 208, e.g., disk drive. It is noted that the program for providing contextual relevance of an unposted message to an activity stream after a period of time elapses, as discussed further below in association with FIGS. 3-4, may reside in disk unit 208 or in application 204.

Analyzer 104 may further include a communications adapter 209 coupled to bus 202. Communications adapter 209 interconnects bus 202 with an outside network (e.g., network 102 of FIG. 1) thereby allowing analyzer 104 to communicate with client devices 101 and social network server 103.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, social networking sites (e.g., Facebook®) present to a particular user the messages posted by users in a social networking feed often referred to as an "activity stream" (e.g., Facebook's® news feed). These messages or "posts" can include text (e.g., comments, sub-comments and replies), audio, video images, etc. The posting of a message to the activity stream may not be immediate. For example, a user may take some time in crafting a message to be posted to the activity stream, such as re-reading the drafted post for spelling/grammatical errors. The user may also be interrupted while crafting the message, such as by a telephone call. Prior to the user posting the message, the focus of the activity stream may change thereby negating the relevance of the unposted message. For example, the focus of an activity stream may change to a different topic of interest after a period of time elapses in response to new users posting messages to the activity stream. If the user is not aware of the change in the focus of the activity stream, the user may post a message that is irrelevant to the current topic of interest in the activity stream thereby causing confusion among users participating in the activity stream. Unfortunately, there is not currently a means for providing the user an indication of the contextual relevance of the unposted message to the activity stream after a period of time elapses.

Figure 3:
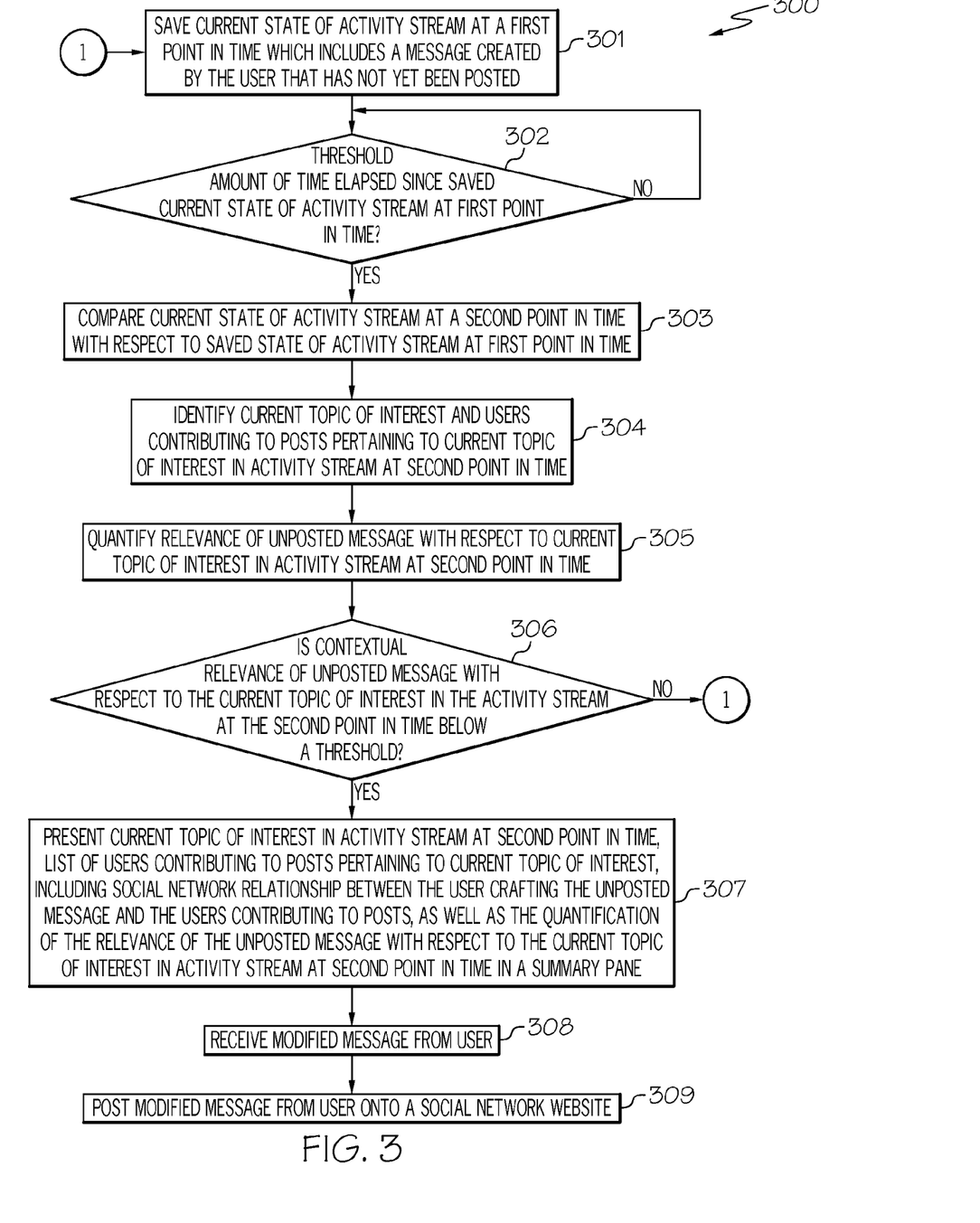
FIG. 3 is a flowchart of a method for providing the user an indication of the contextual relevance of the unposted message to the activity stream after a period of time elapses in accordance with an embodiment of the present invention.
Figure 4:
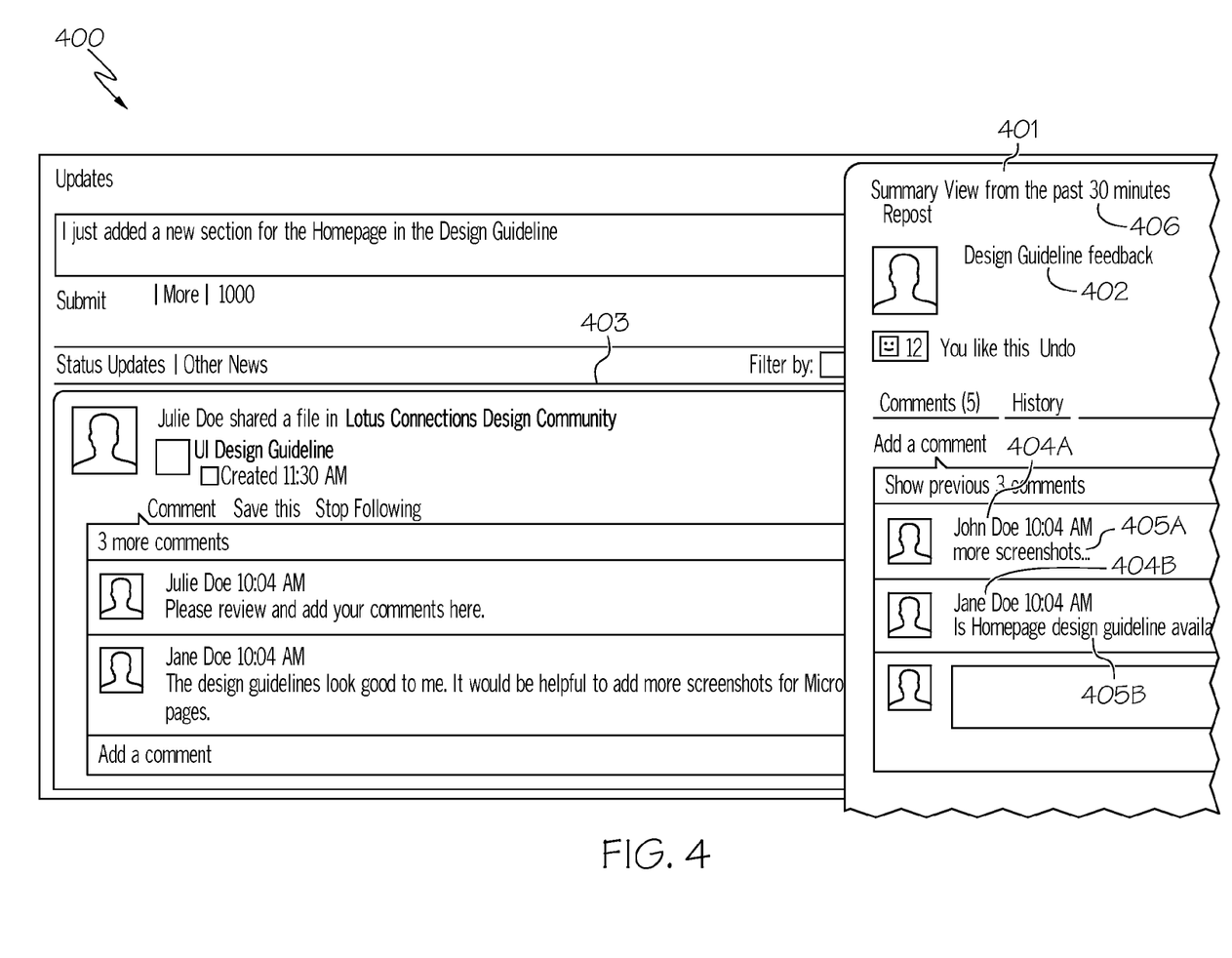
FIG. 4 is a screenshot of a summary pane displaying the current topic of interest in the activity stream and users contributing to the posts pertaining to the current topic of interest in accordance with an embodiment of the present invention.

The principles of the present invention provide a means for providing the user an indication of the contextual relevance of the unposted message to the activity stream after a period of time elapses as discussed below in association with FIGS. 3-4. FIG. 3 is a flowchart of a method for providing the user an indication of the contextual relevance of the unposted message to the activity stream after a period of time elapses. FIG. 4 is a screenshot of a summary pane displaying the current topic of interest in the activity stream and users contributing to the posts pertaining to the current topic of interest.

As stated above, FIG. 3 is a flowchart of a method 300 for providing the user an indication of the contextual relevance of the unposted message to the activity stream after a period of time elapses in accordance with an embodiment of the present invention.

Referring to FIG. 3, in conjunction with FIGS. 1-2, in step 301, analyzer 104 saves the current state of the activity stream at a first point in time, which includes a message created by a user (e.g., user of client device 101A) that has not yet been posted ("unposted message"). The "state" of the activity stream, as used herein, refers to a snapshot of the context of the activity stream (including the posted and unposted messages of the activity stream) at that particular point in time. For example, the user (e.g., user of client device 101A) may be crafting a message pertaining to a recent trade made by the Detroit Tigers baseball team. While the user is crafting the message, the user is interrupted by a phone call and was not able to post the message onto the social network website. Prior to the user posting the message after ending the phone call, the state of the activity stream, including the unposted message, is saved by analyzer 104 in step 301.

In step 302, a determination is made by analyzer 104 as to whether a threshold amount of time (e.g., twenty minutes) has elapsed since the current state of the activity stream was saved in step 301.

If the threshold amount of time has not elapsed since the current state of the activity stream was saved in step 301, then analyzer 104 continues to determine in step 302 as to whether the threshold amount of time (e.g., twenty minutes) has elapsed since the current state of the activity stream was saved in step 301.

If, however, the threshold amount of time has elapsed since the current state of the activity stream was saved in step 301, then, in step 303, analyzer 104 compares the current state of the activity stream at a second point in time (occurs after the threshold period of time has elapsed since the first point of time) with respect to the current state of the activity stream at the first point in time that was saved in step 301. In one embodiment, analyzer 104 utilizes natural language processing in comparing the state of the activity at the second point in time with respect to the state of the activity stream at the first point in time. In one embodiment, analyzer 104 may utilize natural language processing by comparing one or more keywords in the unposted message to the context of the activity stream at the second point in time. For example, keywords may be identified in the unposted message by focusing on the nouns and adjectives used in the message. For instance, referring to the above example, in the unposted message pertaining to a recent trade made by the Detroit Tigers baseball team, the term "trade" and phrase "Detroit Tigers" may be identified as being the keywords in the message thereby identifying the focus of the unposted message. Such keywords may be compared to the keywords used in the messages posted between the first and second points in time.

In step 304, analyzer 104 identifies the current topic of interest of the activity stream at the second point in time and the users (e.g., user of client device 101C) contributing to the posts pertaining to the current topic of interest in the activity stream at the second point in time. In one embodiment, analyzer 104 utilizes natural language processing to derive meaning (i.e., the current topic of interest) from the activity stream. For instance, suppose that a user posts a message pertaining to bats used in baseball. The term "bat" may be interpreted as corresponding to a flying mammal or to a wooden instrument for hitting a baseball. Since the term "baseball" was used in connection with the term "bat," it may be deduced that the term "bat" refers to the wooden instrument used for hitting a baseball as opposed to a flying mammal. Such processing may be used to identify the appropriate topic of interest of the activity stream.

In step 305, analyzer 105 quantifies the relevance of the unposted message with respect to the current topic of interest in the activity stream at the second point in time. For instance, referring to the above example, if the user had initially crafted a message pertaining to a recent trade made by the Detroit Tigers baseball team and the topic of interest in the activity stream at the second point in time pertains to the stock market, then such a change in focus in the activity stream is identified by analyzer 104. As discussed above, the meaning, and hence the topic of interest in the activity stream, may be obtained by analyzer 104 utilizing natural language processing. Furthermore, the relativeness of the unposted message with respect to the topic of interest in the activity stream is determined by analyzer 104 utilizing natural language processing. In one embodiment, such relativeness may be expressed by analyzer 104 in terms of a percentage (e.g., 20% relevant).

In step 306, a determination is made by analyzer 104 as to whether the contextual relevance of the unposted message with respect to the current topic of interest in the activity stream at the second point in time is less than a threshold. For instance, referring to the above example, if analyzer 104 determines that the unposted message is 20% relevant and the unposted message needs to be at least 40% relevant (threshold), then analyzer 104 will present an indication of the lack of relevance of the unposted message with respect to the current topic of interest in the activity stream at the second period of time as discussed below.

If the contextual relevance of the unposted message with respect to the current topic of interest in the activity stream at the second point in time is not less than the threshold, then analyzer 104 saves the current state of the activity stream at a new point in time, which includes a message created by a user (e.g., user of client device 101A) that has not yet been posted ("unposted message") in step 301.

If, however, the contextual relevance of the unposted message with respect to the current topic of interest in the activity stream at the second point in time is less than the threshold, then, in step 307, analyzer 104 presents the current topic of interest in the activity stream at the second point in time and/or a list of the users contributing to the posts pertaining to the current topic of interest at the second point in time and/or the quantification of the relevance of the unposted message with respect to the current topic of interest in the activity stream at the second point in time in a summary pane as shown in FIG. 4. In this manner, the user is provided an indication of the contextual relevance of the unposted message to the activity stream after a period of time elapses as discussed below.

Referring to FIG. 4, FIG. 4 is a screenshot of a summary pane displaying the current topic of interest in the activity stream and users contributing to the posts pertaining to the current topic of interest in accordance with an embodiment of the present invention.

As illustrated in FIG. 4, summary pane 401 includes an indication of the current topic of interest 402 ("Design Guideline Feedback") in the activity stream 403 as well as a listing of the users 404A-404B (identified as "John Doe" and "Jan Doe," respectively) and their associated posts 405A-405B pertaining to the current topic of interest 402. Users 404A-404B may collectively or individually be referred to as users 404 or user 404, respectively. Posts 405A-405B may collectively or individually be referred to as posts 405 or post 405, respectively. In this manner, the user can clearly identify the change in the focus of the activity steam and to modify the unposted message prior to posting the message to the activity stream so that the message will be pertinent to the current discussion in the activity stream. Furthermore, in one embodiment, as further illustrated in summary pane 401, an indication 406 as to the amount of time that has transpired between the first and second points of interest (e.g., 30 minutes) may be provided to the user. In this manner, the user will be informed as to the amount of time that has elapsed since crafting the unposted message with respect to the current topic of interest of the activity stream shown in summary pane 401. While FIG. 4 illustrates a listing of two users 404A-404B with their associated posts 405A-405B in summary pane 401, summary pane 401 may include a listing of any number of users 404 associated with any number of posts 405.

Returning to FIG. 3, in conjunction with FIGS. 1-2 and 4, in addition to presenting to the user the current topic of interest in the activity stream at the second point in time and/or users contributing to the posts pertaining to the current topic of interest at the second point in time and/or the quantification of the relevance of the unposted message with respect to the current topic of interest in the activity stream at the second point in time in step 307, analyzer 104 may also present to the user a social network relationship, such as via a social graph, between the user and the users contributing to the posts pertaining to the current topic of interest in the activity stream at the second point in time. In this manner, the user can quickly identify the relationships the user has with the users contributing to the posts pertaining to the current topic of interest in the activity stream at the second point in time.

In step 308, analyzer 104 receives a modified message (unposted message is modified to be commensurate with the current topic of interest in the activity stream) from the user (e.g., user of client device 101A). For example, the user may modify the unposted message from having a focus on a recent trade made by the Detroit Tigers baseball team to the stock market, which is the current focus in the activity stream.

In step 309, analyzer 104 posts the modified message from the user onto a social network website.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for providing contextual relevance of an unposted message to an activity stream after a period of time elapses, the method comprising:

saving a state of said activity stream at a first point in time which includes a message created by a user that has not yet been posted;

comparing a state of said activity stream at a second point in time with respect to said state of said activity stream at said first point in time in response to a threshold amount of time elapsing since saving said state of said activity stream at said first point in time, wherein said second point of time occurs after said threshold period of time has elapsed since said first point in time;

identifying, by a processor, a current topic of interest and one or more users contributing to posts pertaining to said current topic of interest in said activity stream at said second point in time; and presenting to said user said current topic of interest and a list of said one or more users contributing to posts pertaining to said current topic of interest in said activity stream at said second point in time in response to detecting a contextual relevance of said unposted message with respect to said current topic of interest in said activity stream at said second point in time being below a threshold.

2. The method as recited in claim 1 further comprising:

utilizing natural language processing in comparing said state of said activity stream at said second point in time with respect to said state of said activity stream at said first point in time.

3. The method as recited in claim 2, wherein said natural language processing compares one or more keywords in said unposted message to a context of said activity stream at said second point in time.

4. The method as recited in claim 1 further comprising:

presenting to said user a social network relationship between said user and said users contributing to said posts pertaining to said current topic of interest in said activity stream at said second point in time.

5. The method as recited in claim 1 further comprising:

receiving a modified message from said user, wherein said modified message modifies said message created by said user that has not yet been posted.

6. The method as recited in claim 5 further comprising:

posting said modified message onto a social network website.

7. The method as recited in claim 1 further comprising:

quantifying a relevance of said message created by said user that has not yet been posted with respect to said current topic of interest in said activity stream at said second point in time; and presenting to said user said quantification of said relevance of said message created by said user that has not yet been posted with respect to said current topic of interest in said activity stream at said second point in time.

\* \* \* \* \*